Sept. 14, 1943. N. B. PINYAN 2,329,649
CALCULATING MACHINE
Filed May 7, 1937 5 Sheets-Sheet 2
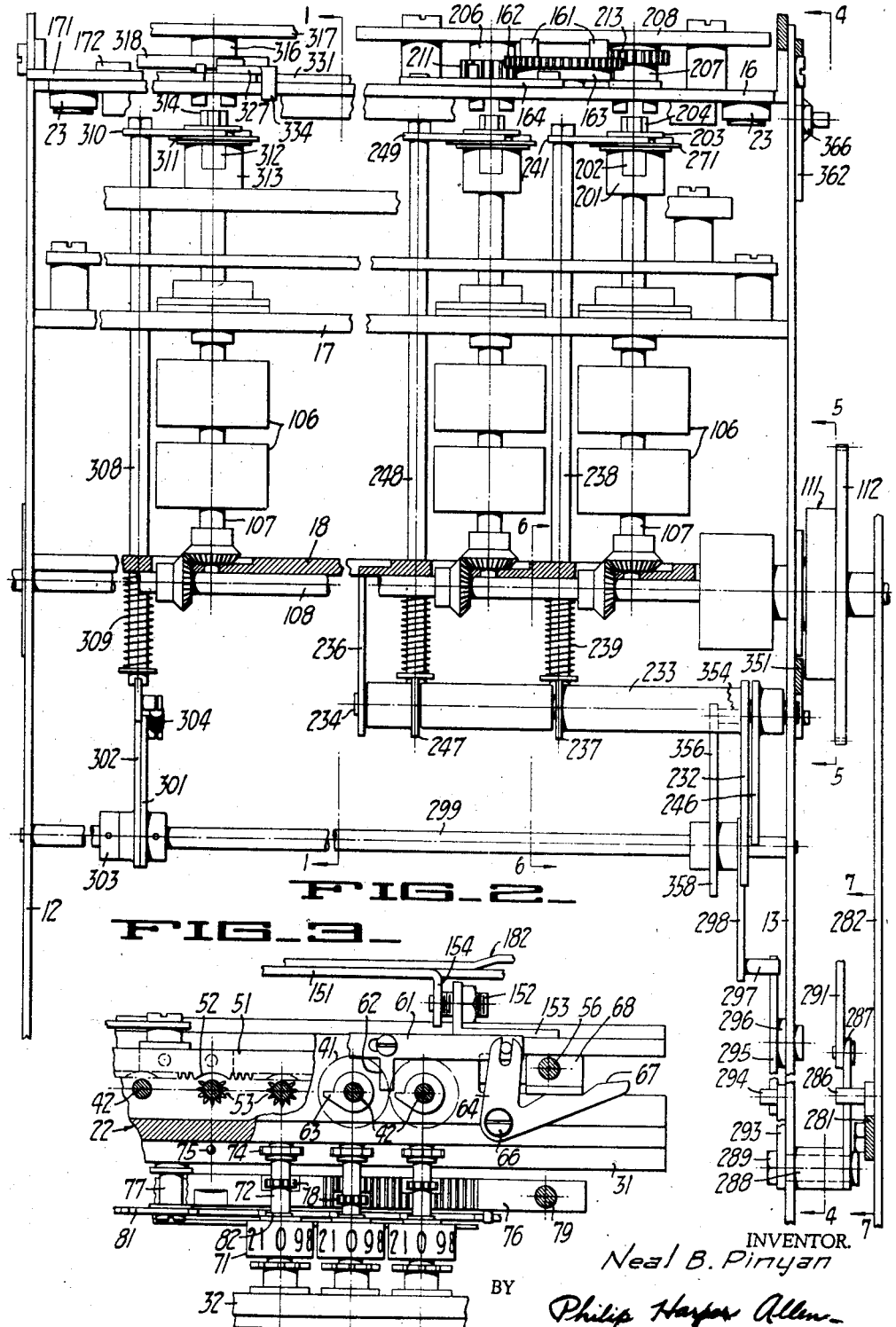
FIG_2_
FIG_3_
INVENTOR.
Neal B. Pinyan
BY
Philip Harper Allen
ATTORNEY.

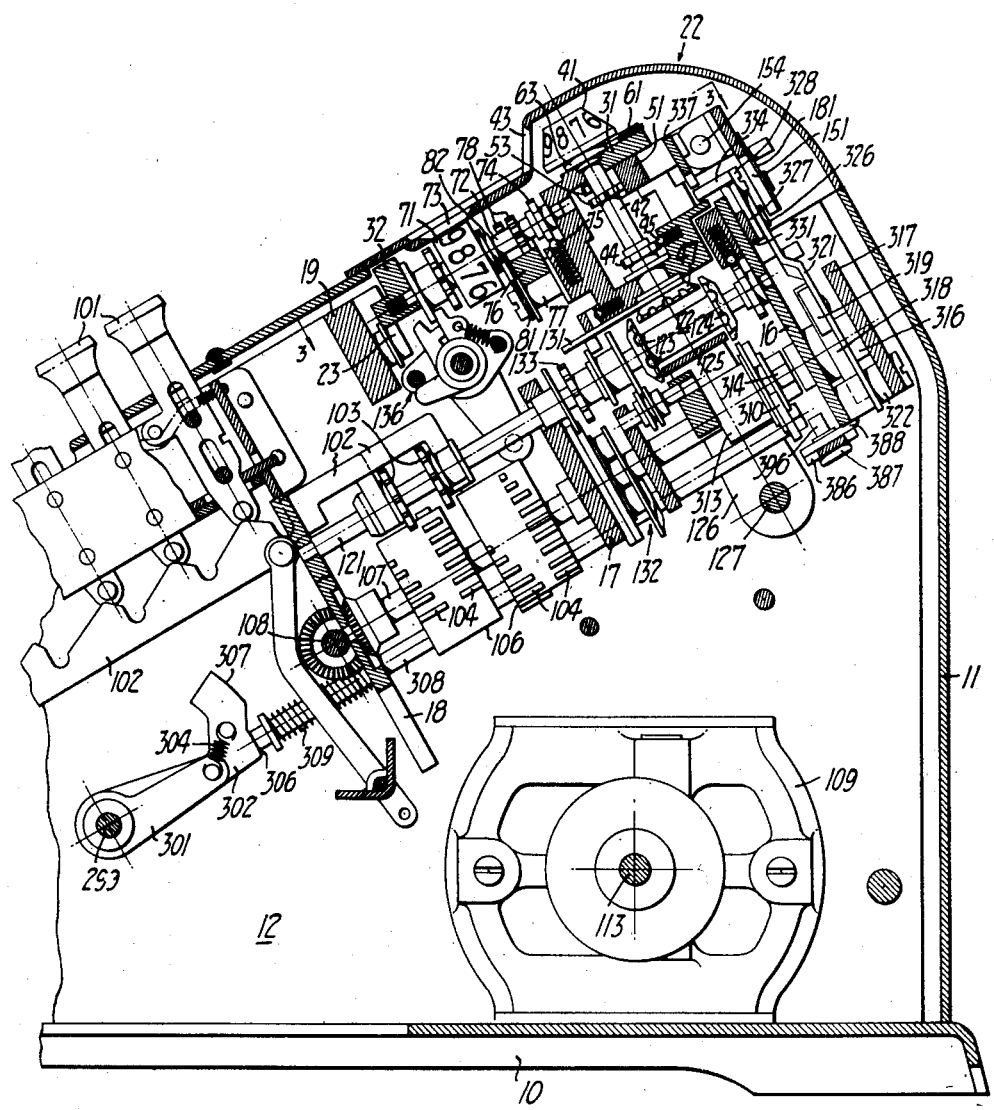

Sept. 14, 1943.  N. B. PINYAN  2,329,649
CALCULATING MACHINE
Filed May 7, 1937  5 Sheets-Sheet 3
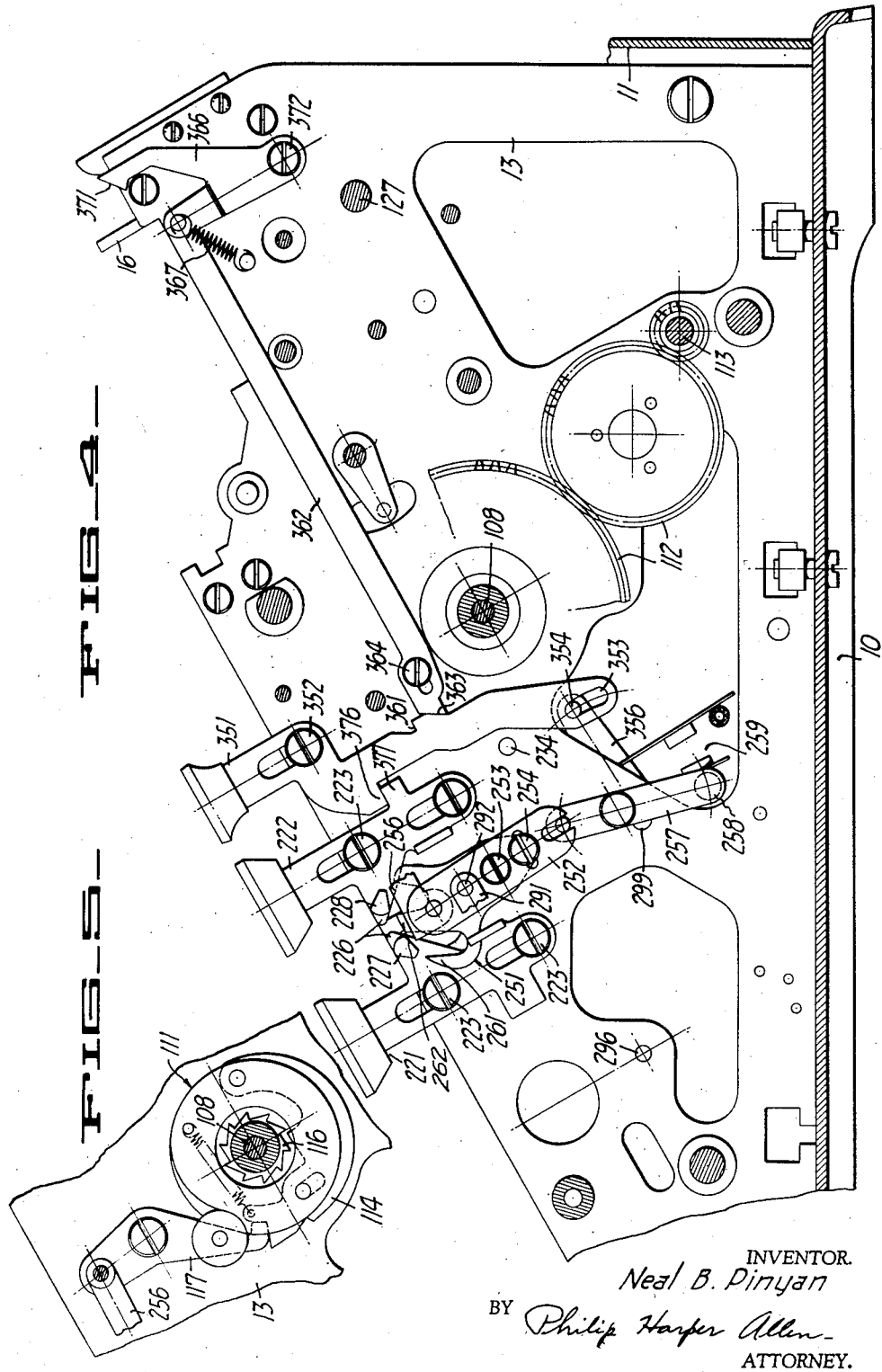
INVENTOR.
Neal B. Pinyan
BY Philip Harper Allen
ATTORNEY.

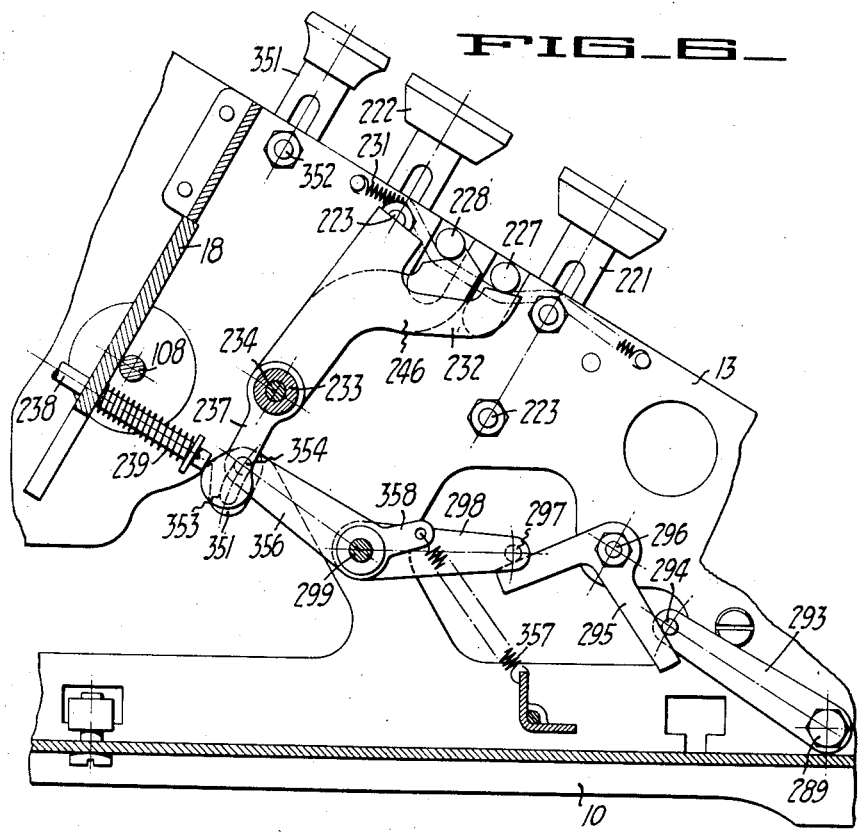
FIG_6_
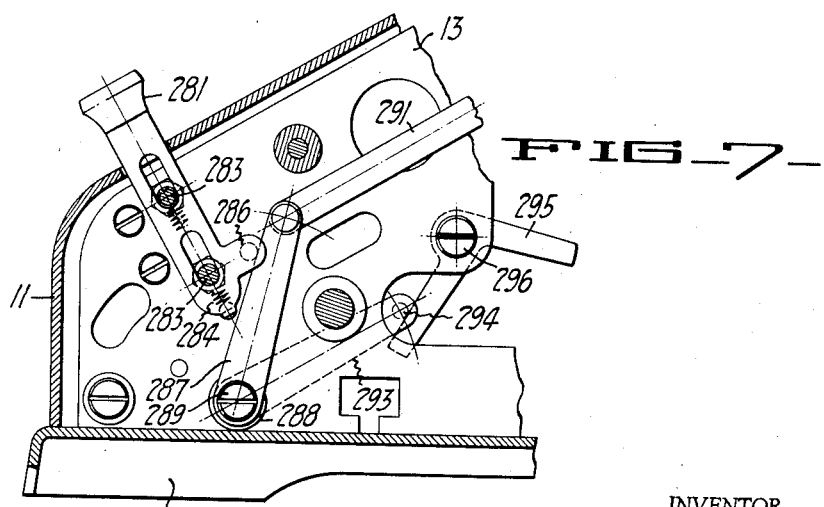
FIG_7_

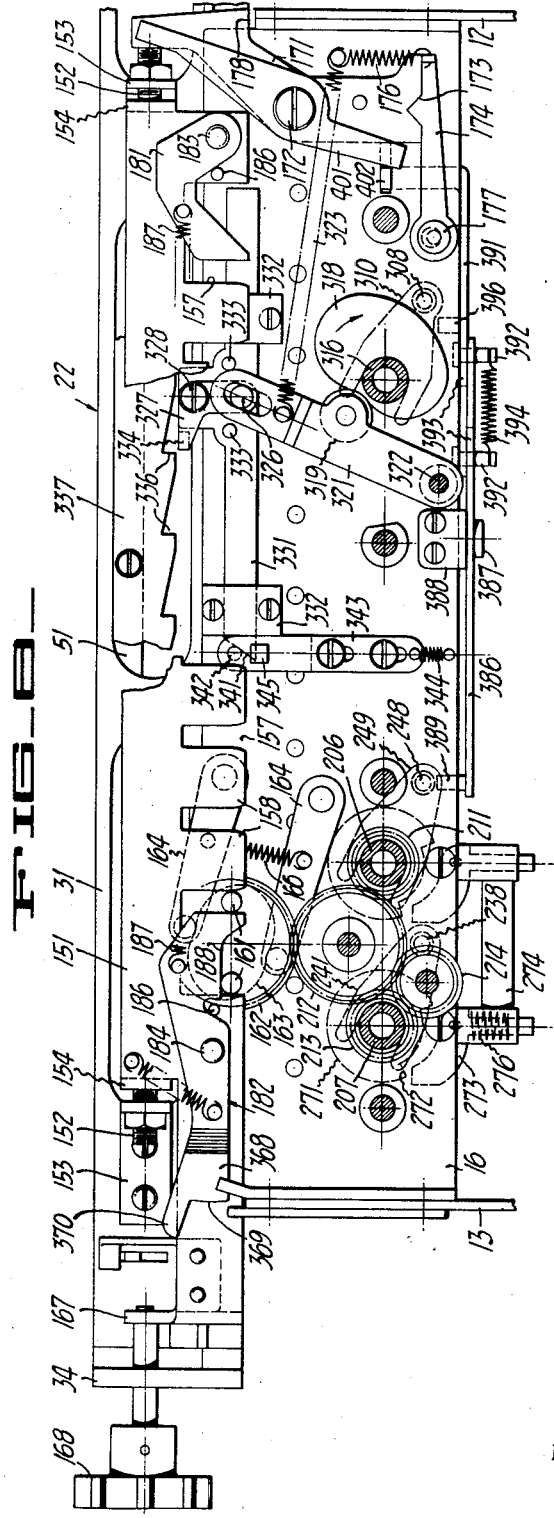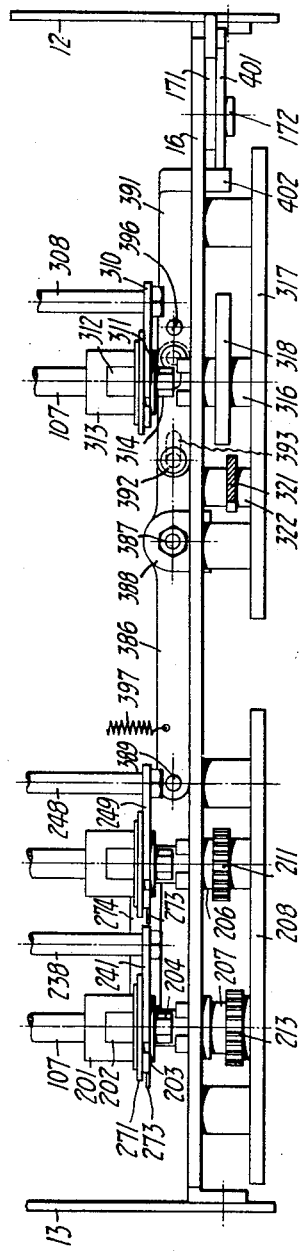

Patented Sept. 14, 1943

2,329,649

UNITED STATES PATENT OFFICE 2,329,649

CALCULATING MACHINE

Neal B. Pinyan, Los Angeles, Calif., assignor to Friden Calculating Machine Co., Inc., a corporation of California Application May 7, 1937, Serial No. 141,291

19 Claims. (Cl. 235—63)

My invention relates to calculating machines having shiftable numeral wheels and more particularly to means for restoring such numeral wheels to zero registration.

In calculating machines having an ordinally shiftable register carriage it is sometimes desirable at the end of a multiplication or division problem to return the carriage to its initial position and to zeroize the numeral wheels of the register in preparation for solution of the next problem. In other operations, it is desirable to reset the numeral wheels of the register in any ordinal position thereof without shifting the register carriage. According to the present invention, both of these operations may be performed selectively as the operator may desire, and resetting or zeroizing of the register may be effected either with or without return of the register to a selected position thereof.

My invention is especially useful in calculating machines having an actuator or actuating means of the universal operation continuous drive cycle type, in which type of machine all machine operations are performed by driving the main actuating means and where a single line of power flow is provided from the source of power, such power flow being continuous and uninterrupted during a machine operation irrespective of the various functions which may be imposed on the machine, such as carriage shifting, both positive and negative value entering, and numeral wheel resetting or zeroizing. With this type actuator, a single cyclically operable clutch is provided which is engaged at the beginning of an operation and remains engaged throughout the operation so that the actuator drive is continuous and uninterrupted.

It is an object of the invention, therefore, to provide improved means for restoring a calculating machine to normal condition between successive machine operations, whereby the zeroizing of the register can be coupled with a return of the register to a home position if desired.

Another object of the invention is to provide an improved resetting mechanism for machines of the character referred to, in which the combined operations of register carriage return and register resetting are effected by improved and simplified means.

Another object of the invention is to provide improved zero resetting means for the shiftable numeral wheels of a calculating machine, whereby such resetting means can be operated in any ordinally shifted position of the numeral wheels, or selectively at the end of a shifting of the numeral wheels.

Another object of the invention is to provide improved means for resetting the shiftable numeral wheels of a calculating machine by a power drive from a non-shiftable source of power.

Another object of the invention is to provide a calculating machine having a universal operation continuous drive cycle type actuator and which attains the foregoing objects.

Other objects will be apparent from the following description, taken in connection with the appended drawings.

In the drawings:

Fig. 1 is a vertical, longitudinal section of the rear part of the machine taken in a plane thru the axis of the actuating means of one order of the machine, as indicated by the line 1—1 in Fig. 2.

Fig. 2 is a fragmentary plan view of the actuating means and the drive connections for the carriage shift and register zero resetting means.

Fig. 3 is a fragmentary sectional plan view of the register carriage taken in the plane of the line 3—3 in Fig. 1.

Fig. 4 is an elevational view of the right side plate of the frame and the operating controls mounted thereon as viewed from the right, the register carriage being omitted. The view is indicated by the line 4—4 in Fig. 2.

Fig. 5 is a fragmentary sectional view illustrating the clutch construction, and is taken in the plane of the line 5—5 in Fig. 2.

Fig. 6 is a fragmentary vertical section of the shift and resetting control means effecting the resetting operation at the end of a carriage return, and is taken in a plane indicated by the line 6—6 in Fig. 2.

Fig. 7 is a fragmentary sectional elevation of the control key for effecting the resetting operation in any shifted position of the register carriage, and is taken in a plane indicated by the line 7—7 of Fig. 2.

Fig. 8 is a rear elevational view of the upper part of the machine with certain parts broken away to show the construction more clearly.

Fig. 9 is a fragmentary plan view of a part of the resetting means.

My invention is disclosed as embodied in a calculating machine having an actuator of the universal operation continuous drive cycle type. A complete machine of this type is illustrated in the co-pending application of Carl M. F. Friden, Serial No. 724,482, filed May 8, 1934.

Generally, the machine comprises a frame and a carriage mounted for lateral shifting movement on the frame. The carriage mounts the accumulator and the revolutions counter, or counting register, while the frame provides a support for the various mechanisms for entering values in and controlling operation of the registers. The frame includes base 10 (Fig. 1) which supports casing 11 and has left and right side plates 12, 13 (Figs. 1 and 2) mounted thereon. Side plates 12, 13 are connected by various cross frame brackets 16, 17, 18 and 19 which serve to mount various mechanisms referred to hereinafter. Register carriage 22 (Fig. 1) is mounted on frame members 16 and 19 by a plurality of similar rollers 23 for endwise shifting movement laterally of the machine in either direction to various ordinal positions as controlled by means described hereinafter. Only one roller 23 is seen in Fig. 1.

Accumulator

Register carriage 22 (Figs. 1 and 3) includes carriage frame 31 and a cross bar 32 supported on the carriage frame in spaced parallel relation therefrom. One of the registers mounted in the carriage is the accumulator comprising numeral wheels 41 (Fig. 1) secured at the upper ends of numeral wheel shafts 42 journalled in spaced parallel relation in carriage frame 31. The numbers registered in wheels 41 (Fig. 1) are maintained in alignment with sight openings 43 by ten-tooth gear 44 on shaft 42 and a spring-pressed ball 45 mounted in carriage frame member 33 and engaged with gear 44. This mechanism also serves to prevent overthrow of wheels 41 after actuation thereof. To transmit increments of value to numeral wheels 41, each shaft 42 extends below carriage frame 31 and has secured thereon a ten-tooth numeral wheel gear 47, which is actuated by means described later. Gear 47 may be of a conventional type of mill cut bevel gear and is indicated schematically in the drawings.

Accumulator zero resetting mechanism

Means are provided in carriage 22 for resetting numeral wheels 41 to zero registration, including means for restoring any displaced wheels to zero position and means for arresting such wheels positively in zero position. The restoring means includes rack bar 51 (Figs. 1 and 3) mounted for endwise sliding movement in the carriage frame adjacent the upper ends of numeral wheel shafts 42. The teeth of rack bar 51 (Fig. 3) are cut away at 52 alternately at the top and bottom to form a plurality of separate racks for cooperation with respective mutilated gears 53 on numeral wheel shafts 42. Adjacent gears 53 are axially offset to cooperate with the adjacent vertically offset rack sections formed on rack bar 51 by cut-away portions 52 thereof.

When rack bar 51 is in normal inactive position, gears 53 are opposite with cut-away portions 52 so that numeral wheels 41 can be actuated without interference. If rack bar 51 is moved to the right as viewed in Fig. 3, the unmutilated parts of gears 53 of any numeral wheels 41 displaced from zero position will be engaged by the associated racks on bar 51, and such displaced numeral wheels 41 are turned until restored to zero position. In this connection it will be noted that any numeral wheels 41 in zero position will not be moved by rack bar 51 because the mutilated portions of gears 53 of such numeral wheels face the rack bar. For manual operation rack bar 51 may be provided with a suitable handle as indicated at 56 in Fig. 3, and by means of which bar 51 can be actuated against the tension of a suitable spring (not shown) which normally maintains bar 51 in inactive position.

The movement of bar 51 to the right as viewed in Fig. 3 to restore any displaced numeral wheels 41 to zero position also enables the means for arresting wheels 41 in such position. Stop slide 61 (Figs. 1 and 3) is mounted for limited endwise movement on top of carriage frame 31 by suitable pin and slot connections, and is provided with a stop projection 62 (Fig. 3) for each numeral wheel 41. Each numeral wheel shaft 42 has a stop tooth 63 secured thereon for cooperation with projections 62 in the zero position of numeral wheels 41. Slide 61 is held normally in inactive position by suitable spring means (not shown) so each projection 62 is out of the path of the associated tooth 63. To provide for movement of projections 62 into path of teeth 63 when zeroising the numeral wheels, bellcrank 64, pivoted at 66 on carriage frame 31, has a suitable pin and slot connection at one end with slide 61 and has cam surface 67 at its other end disposed in the path of arm 68 on rack bar 51. Thus, when bar 51 is moved to restore numeral wheels 41 to zero position, slide 61 is moved by means of bellcrank 64 to arrest wheels 41 in such position.

Thus, the accumulator register can be reset to zero registration manually by manipulation of handle 56. The power operation of the resetting or zeroizing means is described hereinafter.

Revolutions counter

The revolution counter or counting register, which is also carried by carriage 22, comprises numeral wheels 71 on respective parallel shafts 72, which are journalled in carriage frame 31 and cross bar 32. A numeral wheel 71 is provided for each ordinal position of the carriage. The numerals of each of wheels 71 (Fig. 1) are maintained in alignment with the associated sight openings 73 by ten tooth gear 74 and the spring pressed ball 75 engaged therewith, which also serve to prevent overthrow of numeral wheels 71.

Revolutions counter zero resetting mechanism

Means are provided for resetting numeral wheels 71 of the counting register to zero, and as such means is similar to that described in connection with accumulator numeral wheels 41, a general description thereof will suffice. Rack bar 76 (Figs. 1 and 3), similar to rack bar 51, is mounted for endwise movement by flanged studs 77 on carriage frame 31, and is similarly spring urged to inactive position. Axially offset mutilated gears 78 (Fig. 3) on shafts 72 are associated with bar 76 so that movement of bar 76 to the right by manipulation of handle 79 serves to restore numeral wheels 71 to zero position. Slide 81, formed similarly to slide 61, is mounted for cooperation with stop teeth 82 of wheels 71 and is spring urged to active position, being restrained therefrom by a suitable pin on bar 76. The operation of the above described zero resetting means is similar to that described in connection with the accumulator resetting means.

From the foregoing description, it is seen that the shiftable register carriage provides a mounting for both the accumulating and counting registers, which are shiftable with respect to the actuating means therefor mounted in the frame of the machine. Also, each register is provided with zeroizing means shiftable with the carriage. The actuating means and the associated driving and value selecting mechanisms for the registers will now be described. Such mechanisms will be described briefly as they are generally similar to those described in said application.

Driving, actuating and selecting mechanisms

The values to be introduced into the accumulator numeral wheels 41 are selected by means of a plurality of banks or orders of settable value keys 101, one of which banks is illustrated in part in Fig. 1. Each bank of keys 101 cooperate with selecting mechanism including a pair of parallel spring-urged slides 102 mounted for endwise movement to position gears 103 selectively with respect to stepped teeth 104 of the associated actuating cylinder 106 in accordance with the value of the depressed key. One gear 103 of each ordinal pair and the associated slide 102 cooperate with the value keys 101 from "1" to "5" and the left hand set of teeth 104 on the associated cylinder 106 as viewed in Fig. 1, while the other gear 103 and slide 102 cooperate with value keys 101 from "6" to "9" and the right hand set of teeth 104 on such cylinder.

Cylinders 106 (Figs. 1 and 2) are mounted on actuating shafts 107 having suitable bevel gear connections with transverse shaft 108 which is suitably journalled in side plates 12, 13. Each shaft 107 serves for two orders of the machine and has a pair of axially aligned cylinders 106 mounted thereon. Shaft 108 and shafts 107 are driven cyclically from motor 109 (Fig. 1) thru clutch 111 (Figs. 2 and 5) which is driven by suitable gearing 112 (Fig. 4) from motor shaft 113. Clutch 111 is engaged or disengaged by oscillation of spring-urged clutch pawl or dog 114 (Fig. 5) mounted for rotation with shaft 108 and with respect to ratchet 116 journalled on shaft 108 and driven by gearing 112. Clutch control lever 117 pivoted on side member 13 determines engagement or disengagement of the clutch by releasing or engaging the nose of dog 114 in the full cycle position thereof.

From the above description, it is seen that the values set in the machine by depression of keys 101 will be transmitted to gears 103 by the cooperation of gears 103 with teeth 104 of cylinders 106 during cyclic operation of the clutch. Each pair of gears 103 is slidably mounted on a square shaft 121 (Fig. 1) supported in cross members 17, 18 and extending rearwardly of the machine thru cross member 17 and having its rear end journalled in cross member 16. Intermediate members 16, 17, a spool 122 is slidably and non-rotatably mounted on each shaft 121 and has opposite bevel gears 123, 124 at its ends positioned for cooperation with numeral wheel gear 47. Gears 123 and 124 are shown schematically. When one or the other set of gears 123, 124 is engaged with gears 47, numeral wheels 41 will be rotated forwardly or reversely to register a number of increments equal to the value of the depressed keys 101 in the aligned banks of keys.

To control the engagement of gears 123, 124 (Fig. 1) with gears 47, straps 125 is positioned between gears 123 and 124 and is mounted by similar arms 126 for rocking movement with shaft 127. Thus, by rocking shaft 127 either set of gears 123, 124 can be moved on shaft 121 by strap 125 from the position shown in Fig. 1 into engagement with gears 47. Gears 123 transmit positive increments and gears 124 transmit negative increments. Any suitable control means can be provided for controlling the position of shaft 127 and gears 123, 124 and for simultaneously enabling the drive through clutch 111, as for example, the plus and minus keys and the division control lever disclosed in said application.

Any suitable means may be provided for effecting entry of transferred increments in the accumulator register through gears 123, 124 (Fig. 1). For example, the transfer may be effected by means of trip levers 131, transfer actuators 132 on shafts 107, and gears 133 on shafts 121, as disclosed for example in said application.

The number of actuations of accumulator numeral wheels 41 may be registered either positively or negatively in counting numeral wheels 71 in any suitable manner, as, for example, by an actuator 136 (Fig. 1) which may be driven and operated in manner fully described in said application to enter single increments in the active order of the counting register and to carry from order to order in higher orders of the register.

Carriage shift mechanism

Means are provided for shifting the carriage in either direction from one ordinal position to another, either manually by releasing the carriage for free shifting movement, or by power driven means controlled by manually operable keys. Preferably, the power driven means comprises a part of the actuating means for entering values into the accumulator register. Carriage 22 (Fig. 8) has plate 151 mounted along the rear side thereof by means of adjusting screws 152 threaded in brackets 153 on carriage frame 31 and having smooth ends pivotally engaged with laterally projecting end portions 154 of plate 151. Plate 151 has vertical slots 157 formed in the lower edge thereof by teeth 158, slots 157 being spaced apart a distance equal to the ordinal spacing of the machine and aligned with drive shafts 121. Slots 157 are adapted for engagement by opposite shift pins 161 on shift gear 162, which is journalled on frame bracket 16 and is rotated by means described later to shift the carriage by virtue of the engagement of pins 161 in slots 157.

One half revolution of gear 162 effects one ordinal spacing of carriage 22 and to provide for accurate centering of the carriage at the end of a shift, centralizing cam 163, is mounted for rotation with gear 162. Centralizing arms 164 suitably pivoted at one end on frame member 16 have suitable rollers at their opposite ends engaging opposite sides of cam 163 under the influence of spring 166 tensioned between arms 164. When pins 161 are in horizontal alignment the carriage is properly positioned and the centralizing rollers are seated in opposite depressions formed between the high portions of cam 163. Accurate initial positioning of carriage 22 with respect to pins 161 is provided by adjusting screws 152, which are adjusted with the parts positioned as described.

The manual release of the carriage for free shifting movement is effected by rocking plate 151 out of engagement with pins 161 of shift gear 162 against the tension of a suitable spring. Carriage release handle 168 (Fig. 8) is journalled in carriage end plate 34 in axial alignment with screws 152 forming the pivotal axis for plate 151, and has its inner end rigidly but removably connected to the bent end of extension 167 of plate 151. Thus by turning handle 168, plate 151 can be moved out of engagement with pins 161 to permit free shifting movement of the carriage.

Resilient bumper means is provided for preventing shifting of the carriage beyond its left hand end position, to which it is usually returned to begin a calculation. Bumper lever 171 (Fig. 8) is pivoted at 172 on cross frame member 16 and has its upper end positioned for engagement with the head of left adjusting screw 152 (to the right as viewed in Fig. 8) when the carriage is in its left end position. The lower end of lever 171 is notched at 173 for engagement by the nose of centering arm 174 under the tension of spring 176. Arm 174 is pivoted eccentrically at 177 to provide for accurate positioning of bumper lever 171. Thus, centering arm 174 maintains bumper lever 171 resiliently in place. The movement of lever 171 when struck by the carriage is limited by the engagement of abutment 178 thereof with the top of left side plate 12.

Yieldable means are provided to prevent shifting of the register carriage beyond the lowest and highest ordinal positions thereof during power operation of the shifting means. End slots 157 are formed in part by end teeth 158 and in part by respective pawls 181, 182. Pawls 181, 182 are pivoted at 183, 184 respectively on plate 151 and extend inwardly to position the straight end edges thereof opposite end teeth 158 to form end slots 157. Pawls 181, 182 are held resiliently in the position shown against respective stop pins 186 by spring 187 tensioned therebetween. When carriage 22 is in the end position shown, one pin 161 lies in an end slot 157 and the other is positioned beneath adjacent pawl 182 in engagement with cam edge 188 thereof. In this condition rotation of gear 162 in a direction to move the carriage beyond the end position merely results in oscillating pawl 182 by action of pins 161 on cam edge 188. However, upon rotation of gear 162 in a direction to effect carriage shifting to an intermediate ordinal position, the end edge of pawl 182 positively resists the pin 161 in end slot 157 and carriage shifting results. A similar action occurs if the carriage is in its end position adjacent pawl 181. It is seen, therefore, that the carriage cannot be shifted beyond either end position thereof by operation of shift gear 162.

As stated above, shift gear 162 is rotatable in either direction by selectively operable drive connections with portions of the actuating means of the machine. For this purpose, the lowest order actuating shafts 107 (Fig. 2) are extended rearwardly and have respective collars 201 secured adjacent the ends thereof. Each collar 201 is provided with parallel slots slidably engaged by corresponding teeth 202 of a shiftable drive establishing collar 203 mounted freely on the end of shaft 107. Opposite teeth 202 thereof, each collar 203 has smaller teeth 204 adapted for engagement with corresponding slots in respective gear sleeves 206, 207, which are journalled in frame bracket 16 and small plate 208 mounted on bracket 16 by suitable spacers and fastening screws.

Gear sleeve 206 (Figs. 2 and 8) has gear 211 meshing with idler gear 212 (Fig. 8) journalled in bracket 16 and plate 208 and also meshing with shift gear 162. Gear sleeve 207 (Figs. 2 and 8) has gear 213 (Fig. 8) offset axially from idler gear 212 and meshing with wide reverse idler gear 214 suitably journalled in bracket 16 and plate 208 and also meshing with idler gear 212. Thus, rotation of gear sleeve 206 in clockwise direction as viewed in Fig. 8 causes clockwise rotation of shift gear 162 and shifting of carriage 22 to the left as viewed from the front of the machine. Correspondingly, rotation of gear sleeve 207 in a clockwise direction as viewed in Fig. 8 effects counterclockwise rotation of shift gear 162 and shifting of carriage 22 to the right as viewed from the front of the machine.

Thus, by virtue of the selectively established drive connections between gear sleeves 206, 207 (Fig. 2) and collars 201 upon selective shifting of respective shiftable collars 203, carriage 22 can be shifted in either direction. The gear ratios are so chosen that one rotation of actuating shafts 107 effects one-half rotation of shift gear 162.

Carriage shift keys

Manually operable control means are provided for the carriage shifting mechanism described above to enable selective shifting of the carriage in either direction through one or more ordinal spaces. Shift keys 221, 222 (Figs. 4 and 6) are depressible to initiate shifting of the carriage to the right and left, respectively, as viewed from the front of the machine. Depression of either key serves to enable a drive connection from a portion of the actuating means to the carriage shifting mechanism during the first part of its downward movement and thereafter to engage the clutch and energize the motor.

Keys 221, 222 (Fig. 4) are mounted for endwise movement by suitable longitudinal slots formed therein and engaged by a plurality of studs 223 secured on side plate 13. Keys 221, 222 have adjacent ears 226 with respective studs 227, 228 mounted therein and extending to either side thereof. To maintain the shift keys resiliently in raised position, coil spring 231 (Fig. 6) is provided having its ends fastened to side plate 13 and passing over upper studs 223 and under the ends of studs 227, 228 which extend through suitable slots in plate 13.

To enable the drive connection from a shaft of the actuating means to the carriage shifting mechanism upon depression of shift key 221, stud 227 is located above the upper end of arm 232 secured on sleeve 233 (Fig. 2). Sleeve 233 is journalled on transverse shaft 234 which is suitably journalled at its ends in side plate 13 and bracket 236 on cross bracket 18. At its left end, sleeve 233 is provided with depending arm 237 (Fig. 6) having its rounded end in engagement with the front end of rearwardly extending rod 238 (Figs. 2 and 6). Rod 238 is mounted for sliding movement in cross frame brackets 17, 18 and is resiliently urged to its forward position by spring 239 compressed between bracket 18 and a suitable washer on rod 238. At its rear end, rod 238 (Fig. 2) has shift fork 241 secured thereon with its forked end in engagement with an annular groove in right-hand shiftable collar 203.

From the foregoing description, it is seen that depression of key 221 is effective through stud 227 to rock arm 232, sleeve 233 and arm 237 to move rod 238 rearwardly. Such rearward movement of rod 238 is effective through shift fork 241 to engage teeth 204 of right-hand shift collar 203 with corresponding slots in gear sleeve 207. Thus, initial depression of shift key 221 is effective to enable a drive connection from a a portion of the actuating means to the carriage shifting mechanism. The drive connection between gear sleeve 207 and its associated collar 203 determines shifting of the carriage to the right.

A similar mechanism is employed in connection with shift key 222 to enable the drive connection to determine shifting of the carriage to the left. Stud 228 (Fig. 6) is located above the upper end of arm 246 having its hub secured on shaft 234. At its left end, shaft 234 (Fig. 2) has depending arm 247 secured thereon in operative relation with shift rod 248 having shift fork 249 at its rear end in engagement with an annular groove in left-hand shift collar 203. It is seen, therefore, that depression of key 222 results in rocking of shaft 234 and rearward movement of rod 248 to engage left-hand shift collar 203 with gear sleeve 206. This conditions the carriage shift mechanism for shifting of the carriage to the left. It is to be noted that only a small amount of movement is required to engage teeth 202 with the corresponding slots in gear sleeves 206, 207 so that the drive connection is enabled during the first part of the downward movement of keys 221, 222.

The latter part of the downward movement of keys 221, 222 is utilized to engage the clutch and energize the motor. Studs 227 and 228 (Fig. 4) overlie respective cam surfaces at the upper end of lever 251. Lever 251 is adjustably secured on lever 252 by pivot 253 and by pin and slot connection 254 having suitable clamping means for maintaining the relative adjustment between levers 251, 252. From the relation of studs 227, 228 and lever 251, it is evident that depression of either of keys 221, 222 is effective during the latter part of the key movement to rock levers 251, 252 in a clockwise direction. Lever 252 is connected at its upper end by link 256 (Figs. 4 and 5) with clutch control lever 117, so that movement of link 256 upon depression of either of the shift keys will result in moving control lever 117 in a clockwise direction as viewed in Fig. 5. Such movement is effective in the manner previously described to engage the clutch.

The motor is energized upon oscillation of lever 252, which, for this purpose, is provided with a pin and slot connection with lever 257 having pin 258 mounted adjacent contacts 259 of the motor circuit. Upon depression of either shift key, pin 258 is moved to close contacts 259.

Lever 251 (Fig. 4) also provides an interlock between shift keys 221, 222 by means of lock portions 261, 262 which are adapted to cooperate with studs 227, 228 respectively. For example, if key 221 is depressed, lock portion 262 moves into blocking position beneath stud 228.

Means are provided for maintaining the drive connection for the carriage shifting mechanism throughout each cycle of movement even though the depressed shift key be released immediately after depression thereof and before complete shifting of the carriage. For this purpose each shiftable collar 203 is provided with a similar mechanism, only one of which will be described. Right-hand shiftable collar 203 (Figs. 8 and 9) is provided with disc 271 having a cut-away portion 272 which, in the full cycle position of collar 203, is in the position illustrated in Fig. 8. Immediately to the rear of the disc 271, locking element 273 is provided mounted in bracket 274 for movement radially of collar 203, and urged to its extended position by spring 276. With shiftable collar 203 in its inactive position disc 271 is positioned forwardly of locking element 273, and when moved rearwardly of the machine to its active position, passes by element 273 which is in alignment with the cut-away portion 272. Upon subsequent rotation of disc 271 the solid portion thereof engages element 273 and prevents movement of collar 203 forwardly of the machine so that teeth 202 are maintained in engagement with gear sleeve 207 irrespective of release of the associated shift key. Left-hand shiftable collar 203 is held in drive establishing position for each cycle of rotation by similar mechanism.

From the foregoing description it is seen that keys 221, 222 and the associated mechanism provide means for shifting the carriage selectively in either direction from one ordinal position of the carriage to another. Obviously, if a shift key be maintained in depressed position, shifting will continue until the carriage reaches an end position, when, as previously described, continued operation of the shifting mechanism in the same direction becomes ineffective.

*Register return and zero resetting mechanism*

As stated in the introduction, means are provided for restoring the machine to normal condition between successive operations. The restoring being effected selectively, either by returning the carriage to its left-hand position and by resetting the accumulator to zero after its return to such position, or by resetting the accumulator in any ordinal position thereof without shifting of the carriage. Both of these functions are controlled by selectively manipulable means in the form of control keys, each of which is operated by a single manual stroke. The control means for effecting resetting in any position of the carriage will be described first.

Resetting key 281 (Figs. 2 and 7) is mounted for endwise movement on plate 282 (Fig. 2) suitably secured in spaced relation from side plate 13, and such movement may be provided by means of suitable longitudinal slots in the key therein engaging studs 283 on plate 282, spring 284 serving to yieldably retain the key in the raised position illustrated. Key 281 is provided with a pin 286 operatively related to an arm 287 extending upwardly from a stud 289 pivoted in bearing 288 on plate 13. Thus, upon depression of key 281, arm 287 and stud 289 will be rocked in a clockwise direction, and such movement is utilized to engage the clutch and establish a drive connection from a member of the actuating means to the resetting mechanism.

To engage the clutch and enable the motor circuit, the upper end of arm 287 is pivotally connected to a link 291 which extends rearwardly of the machine and is connected at 292 (Fig. 4) to lever 252 which, as previously described, controls the engagement of the clutch and the closing of the motor circuit.

To establish a drive connection from the actuating means to the resetting mechanism, stud 289 (Figs. 2 and 7) is provided with an arm 293 having a pin 294 (Fig. 6) operatively engaged with a bell crank 295 pivoted at 296 on plate 13. The other arm of bell crank 295 lies under a pin 297 on an arm 298 secured on a transverse shaft 299. As seen in Fig. 2, shaft 299 extends between and is journalled in side plates 12 and 13, and adjacent its left end carries an arm 301 secured thereon and a second arm 302 loosely mounted thereon between the hub of arm 301 and a collar 303. As seen in Fig. 1, arms 301 and 302 are connected by spring 304 so that arm 302 will follow the movement of arm 301 unless restrained as described later in connection with resetting after return of the carriage to its left end position.

Arm 302 is provided with arcuate end surfaces 306 and 307 of different radii which are connected by a suitable cam surface. In the normal position of the parts shown in Fig. 1 surface 306 is engaged by the end of shift rod 308 under the influence of spring 309 compressed between bracket 18 and a suitable collar on rod 308. Rod 308 is mounted for endwise sliding movement in brackets 17 and 18, and at its rear end (Figs. 1, 8 and 9), carries resetting control fork 310 which is operatively engaged with drive establishing collar 311 journalled on an actuating shaft 107. Collar 311 rotates with the associated shaft 107 and for this purpose has teeth 312 engaged with complementary notches in collar 313 secured on the actuating shaft 107. Collar 311 is also provided with smaller teeth 314 which are adapted for engagement with corresponding notches in a sleeve 316 journalled in bracket 16 and in plate 317 spaced from and mounted on bracket 16 by suitable means. Sleeve 316 carries a cam 318 which forms a part of the drive means for the resetting mechanism of the accumulator. Thus, oscillation of shaft 299 upon depression of key 281 serves by movement of rod 308, fork 310 and collar 311, to establish the drive connection for the resetting means.

As seen in Fig. 8, cam 318 is operatively engaged by roller 319 journalled intermediate the ends of an arm 321 pivoted at 322 on bracket 16, spring 323 connected to arm 321 and a suitable pin on bracket 16 serving to maintain roller 319 operatively related to the cam. At its upper end, arm 321 is slotted to engage pin 326 on actuating pawl 327 pivoted at 328 on slide 331, which is mounted for endwise movement by plates 332 on bracket 16. The pivotal movement of pawl 327 with respect to slide 331 is limited by studs 333 on the slide. Pawl 327 is provided with a laterally extending actuating tooth 334 for engagement with the teeth 336 of a rack 337 suitably mounted on resetting rack bar 51 for the accumulator and spaced therefrom. A tooth 336 is provided for each ordinal position of the carriage, so that pawl 327 can effect a resetting operation in any such ordinal position.

Pawl 327 is normally positioned as shown in Fig. 8 so that tooth 334 lies below the associated rack tooth 336, and the carriage can be shifted without interference. When cam 318 oscillates arm 321, the first action is to rock pawl 327 so that its actuating tooth 334 is operatively engaged with the associated rack tooth 336, and subsequently, pawl 327, slide 331, and resetting rack bar 51 move as a unit to effect the resetting operation. After this operation, the parts are restored to the position shown in Fig. 8.

From the above description, it is seen that the accumulator can be zeroized in any shifted position by operation of key 281. If desired, the revolutions counter may also be reset by similar means, or may be coupled with the accumulator for simultaneous zeroizing, as shown, for example, in the co-pending application of Carl M. F. Friden, Serial No. 42,268, filed September 26, 1935.

Means are provided for preventing undesired movement of the carriage with the resetting rack bar when such bar is reciprocated during a resetting operation. For this purpose, the left end of actuating slide is formed with a cam surface 341 for cooperation with a pin 342 on a latch bar 343 suitably mounted for vertical sliding movement on bracket 16. Bar 343 is held normally in the position shown in Fig. 8 by spring 344, with latching tooth 345 thereof immediately below carriage shift rack 151 and in alignment with a notch 157. Upon movement of slide 331 to the left as viewed in Fig. 8, latching tooth 345 is moved into engagement with the aligned notch 157.

*Combined carriage return and register resetting*

The means provided for combined carriage return and register resetting will now be described, such means being characterized by the provision of resetting control means which is conditioned at the beginning of the associated carriage shifting operation to determine a single cycle of operation of the resetting means at the end of the carriage shifting operation.

Carriage return and register resetting key 351 (Fig. 4) is operative upon depression thereof to condition a drive connection between the power driven resetting mechanism and a shaft of the actuating means and to initiate a carriage shifting operation, the resetting mechanism becoming operative at the end of the shifting operation. Key 351 is mounted on side member 13 adjacent shift key 222 for substantially endwise movement, and for this purpose, is slotted adjacent its upper end for engagement by stud 352 and at its lower end has a slot 353 engaging a pin 354 on arm 356 (Figs. 4 and 6) secured on shaft 299. Key 351 is urged to its raised position by spring 357 secured to extension 358 of arm 356 thereby tending to rock arm 356 in a clockwise direction as viewed in Fig. 6. As pin 354 normally engages the upper end of slot 353, arm 356 can move upon depression of key 281 without effecting key 351.

Key 351 is latched in depressed position until the carriage return and resetting operations are effected when the latch is automatically released. Intermediate its ends, key 351 (Fig. 4) is provided with latching notch 361 for cooperation with latching slide 362. In the raised position of key 351 as shown in Fig. 4, slide 362 has its nose engaged with cam surface 363 on key 351 below notch 361. Slide 362 is mounted for endwise sliding movement by means of pin 364 engaging a slot at the front end of slide 362 and by a pivotal connection at its rear end with latch releasing member 366. Spring 367, tensioned between a pin on side member 13 and the rear end of slide 362, urges slide 362 to active position, so that upon depression of key 351, slide 362 will engage latching notch 361 and maintain key 351 in depressed position until slide 362 is retracted by releasing member 366. To effect the latch release, pawl 182 (Fig. 8) has arm 368 terminating in shoulder 369 and latch releasing extension 370. Extension 370 overlies cam surface 371 (Fig. 4) of latch releasing member 366 which is pivoted at 372 on side member 13. It will be recalled that with the carriage in the end position shown in Fig. 8 and a carriage shift key depressed, pawl 182 is oscillated during each cycle of operation of the actuating means by the engagement of a pin 161 with cam surface 188. As arm 368 of pawl 182 moves downwardly shoulder 369 moves into operative engagement with side plate 13 and extension 370 contacts cam surface 371 (Fig. 4). The engagement of shoulder 369 with member 13 blocks unnecessary movement of the carriage because of the actuation of resetting bar 51, and the engagement of the extension 370 with cam surface 371 rocks latch release member 366 so that latch slide 362 is moved to the right to release the key 351.

To initiate the carriage return determined by depression of key 351, shoulder 376 (Fig. 4) is provided on key 351 overlying lug 377 of shift key 222. Thus, depression of key 351 also causes depression of shift key 222 and initiates a shifting operation as described in connection with key 222. Because key 351 is latched in depressed position, carriage shifting will continue until return of the carriage to its left end position.

As stated above, and as will be more apparent from the description of the operation, when the carriage is returned to its end position, if displaced therefrom, the resetting means is enabled, and the next revolution of the actuating means is effective to reset the accumulator register to zero and to release the latch for key 351.

Normally, when key 3551 is used, the carriage is out of its left end position and the shifting means is enabled and means are provided under control of the shifting means for preventing movement of rod 308 to establish the resetting drive connection when the carriage is being shifted, such preventing means being disabled when the carriage is in its left end position.

Referring to Figs. 8 and 9, the control for the resetting drive may comprise a lever 386 pivoted intermediate its ends by pin 387 in a bracket 388 on frame bracket 16 and having at one end a pin 389 lying in the path of shift fork 249. At its other, lever 386 carries a slide 391 mounted thereon for endwise movement by respective pins 392 and slots 393, one pin 392 and one slot 393 being provided on lever 386 and on slide 391. Spring 394 is tensioned between pins 392 so that slide 391 normally is positioned with pin 396 thereon in alignment with resetting shift fork 310. This condition does not obtain in Figs. 8 and 9 because the carriage is in its end position where slide 391 is moved against the tension of spring 394 as will be described hereinafter. Pins 389 and 396 are so spaced relative to respective shift forks 249 and 310 that when either fork is moved to drive establishing position, the other fork is blocked from movement by its associated pin. Spring 397 (Fig. 9) suitably tensioned between lever 386 and a frame piece normally holds pin 389 in contact with shift fork 249.

From the above description, it will be noted that when shift fork 249 is moved to active position upon depression of return and resetting key 351, lever 386 and slide 391 thereon are moved to place pin 396 in blocking engagement with resetting fork 310 so that the drive for the resetting mechanism cannot be established until the blocking means is disabled, depression of return and resetting key 351 merely serving to tension spring 304 between arms 301 and 302.

Means are provided for disabling the resetting blocking means as the carriage enters its left end or "home" position during the carriage return operation. Such means may comprise a lever 401 pivoted coaxially with carriage stop lever 171 for engagement with screw 152 as the carriage enters its home position. The lower end of lever 401 is operatively related with offset end 402 of slide 391 which projects thru a suitable slot in bracket 16. Thus, as the carriage enters its left end position slide 391 is moved to the position shown in Fig. 8 so that pin 396 no longer blocks movement of resetting control fork 310, spring 304 becomes effective to shift fork 310 and enable the drive for the resetting mechanism. Thus, the resetting mechanism will be driven for one cycle of operation of the actuating means to effect the resetting operation as described above.

As previously described, this cycle of operation serves to rock pawl 182 so as to engage the cam surface of latch releasing member 366 to release the key 351, and the resetting operation is ended.

*Operation*

The operation of the resetting mechanism will now be described as controlled from key 281 which determines resetting of the register in any shifted position of the register carriage. Depression of key 281 (Figs. 6 and 7) operates through arm 287, arm 293, bellcrank 295 and arm 298 to rock shaft 299 in a clockwise direction as viewed in Fig. 1. Such movement of shaft 299 serves through arms 301 and 302 thereon to shift rod 308 rearwardly of the machine whereby resetting control fork 310 (Figs. 2 and 9) moves collar 311 to connect sleeve 316 and cam 318 thereon to the associated actuating shaft 107.

Depression of key 281 (Figs. 4 and 7) also serves, through arm 287 and link 291 to rock 252 and 257 to engage the clutch and close the motor circuit, whereby the actuating means is operated and cam 318 (Fig. 8) is rotated. Rotation of cam 318, moves arm 321 to rock actuating pawl 327 to active position, after which it moves with slide 331 to actuate rack bars 337 and 51 to effect the resetting operation. At the same time, slide 343 is moved by actuating slide 331 to move locking pin 345 into engagement with shift rack 151 of the carriage to block movement thereof during the resetting operation.

When the operator desires to couple a carriage return operation with resetting, key 351 is employed. Return and reset key 351 (Fig. 4) is depressed and is latched in depressed position by slide 362. The depression of key 351 thru arm 356, shaft 299 (Figs. 1 and 6) and arm 301 serves to place tension on spring 304 and thereby condition the resetting mechanism for operation at the end of the carriage return.

To start the shifting operation which returns the carriage to its end position, depression of key 351 thru shoulder 376 and lug 377 also depresses shift key 222 to enable the carriage shifting mechanism for shifting the carriage to the left. Such depression of shift key 222 establishes the drive connection for shift gear 162 by movement of rod 248 and fork 249, and also engages the clutch and enables the motor circuit. It will be recalled that movement of shift fork 249 (Fig. 8) to active position oscillates lever 386 and slide 391 to move pin 396 into blocking engagement with resetting control fork 310, thereby preventing enabling of the resetting drive until the end of the shifting operation. Shifting of the carriage to its left end position (to the right as viewed in Fig. 8), therefore, is the first function performed after depression of key 351. As the carriage enters its left end position, screw 152 engages and rocks lever 401 whereby slide 391 is moved to place pin 396 out of alignment with resetting control fork 310, so that the fork can be moved to drive establishing position by the energy stored in spring 304. During the next cycle of the actuating means, the resetting operation is performed as previously described, and pawl 182 is oscillated to actuate latch releasing member 366 and release key 351 so that key 351 and shift key 222 are free to rise and the operation stops at the end of that cycle.

While I have shown and described a preferred embodiment of my invention, it is to be understood that various changes and modifications may be made without departing from the true scope of my invention as defined in the claims appended hereto.

I, therefore, claim as my invention:

1. In a calculating machine, a register, means for returning said register to a home position, means for effecting power resetting of said register, a common control means for said returning and resetting means, a positive connection from said control means to said register returning means, a yieldable connection from said control means to said resetting means, means enabled by said positive connection upon movement thereof for resisting movement of said yieldable connection, and means brought into play by said register in its home position for disabling said movement resisting means.

2. In a calculating machine, a register, means for returning said register to a home position, means for effecting power resetting of said register, a common control means for said returning and resetting means, connections from said control means to said register returning means and to said resetting means, and means brought into play by said control means upon manipulation thereof for effecting immediate operative movement of said returning means connection and for placing a bias on said resetting means connection while preventing operative movement thereof.

3. In a calculating machine, a register, means for returning said register to a home position, means for effecting power resetting of said register, a common control means for said returning and resetting means, connections from said control means to said register returning means and to said resetting means, means brought into play by said control means upon manipulation thereof for effecting immediate movement of said returning means connection and for placing a bias on said resetting means connection while preventing operative movement thereof, and means operatively related to said register returning means and said resetting means connection for subsequently enabling operative movement of said resetting means connection.

4. In a calculating machine, a register, a source of power, means for shifting said register driven by said source of power including normally disabled drive means, means for resetting said register driven by said source of power including normally disabled drive means, a common control means for said shifting and resetting means, a positive connection from said control means for enabling said shifting drive means, a yieldable connection from said control means for enabling said resetting drive means, and means movable to active position upon manipulation of said control means to cause yielding of said yieldable connection until the end of the shifting movement of said register.

5. In a calculating machine, a register, a source of power, means for shifting said register driven by said source of power including normally disabled drive means, means for resetting said register driven by said source of power including normally disabled drive means, a common control means for said shifting and resetting means, a positive connection from said control means for enabling said shifting drive means, a yieldable connection from said control means for enabling said resetting drive means, means movable to active position upon manipulation of said control means for blocking movement of said yieldable connection, and means controlled by said shifting means for disabling said movement blocking means.

6. In a calculating machine, a register, a source of power, means for shifting said register driven by said source of power including normally disabled drive means, means for resetting said register driven by said source of power including normally disabled drive means, a common control means for said shifting and resetting means, a positive connection from said control means for enabling said shifting drive means, a yieldable connection from said control means for enabling said resetting drive means, means operable by said positive connection upon movement thereof for blocking movement of said yieldable connection, and means operated by said register in a predetermined ordinal position thereof for disabling said block means.

7. In a calculating machine, a shiftable carriage, a register on said carriage, a source of power, means for shifting said carriage driven by said source of power, means for resetting said register driven by said source of power, a shifting control member for effecting operation of said shifting means, a resetting control member for effecting operation of said resetting means, yieldable blocking means operatively related to said control members for preventing simultaneous operative movement thereof, and means engageable by said carriage and operatively related to said blocking means for effecting yielding thereof.

8. In a calculating machine, a shiftable carriage, a register on said carriage, a source of power, means for shifting said carriage driven by said source of power, means for resetting said register driven by said source of power, a shifting control member for effecting operation of said shifting means, a resetting control member for effecting operation of said resetting means, yieldable blocking means operatively related to said control members including a spring-urged slide normally positioned in operative relation to said resetting control member, and a lever positioned for engagement by said carriage and operatively related to said slide for effecting movement thereof out of operative relation with said resetting control member.

9. In a calculating machine, a frame, a carriage shiftable on said frame, a series of numeral wheels on said carriage, zero resetting means on said carriage for simultaneously returning said numeral wheels to zero registration, cyclically operable drive means on said frame, means operable by said drive means for driving said zero resetting means, means operable by said drive means for shifting said carriage, and common control means for effecting operation of said shifting means and said zero resetting means seriatim, said common control means including means for maintaining said zero resetting drive means inactive until the end of the shifting operation.

10. In a calculating machine, a frame, a register comprising a series of numeral wheels mounted for endwise shifting movement on said frame, a source of power, means driven by said source of power for effecting ordinal shifting movement of said register, normally inactive means driven from said source of power for resetting said register to zero by simultaneously zeroizing all numeral wheels thereon displaced from zero positions, said resetting means including a zeroizing mechanism on said carriage and a resetting drive member on said frame, and common control means operable to enable and cause operation of said shifting means and said resetting means seriatim, said control means including means for preventing operation of said drive member until completion of the shifting movement of said carriage.

11. In a calculating machine, a frame, a register comprising a series of numeral wheels mounted for endwise shifting movement on said frame, a source of power, means driven by said source of power for effecting ordinal shifting movement of said register, means for effecting simultaneous resetting of said numeral wheels including zeroizing mechanism in said carriage and a drive member on said frame, said drive member having a normally disabled drive connection from said source of power, an element operable by said shifting means, and means controlled by movement of said element for enabling said drive connection.

12. In a calculating machine, a register comprising a series of numeral wheels, a source of power, means operable by said source of power for resetting said register by simultaneous zeroizing of said numeral wheels, said resetting means including a drive member on said frame, means for performing another machine operation including control means therefor, means controlled by said control means for conditioning said resetting means for operation, and means brought into play under control of said machine operation performing means at the end of the machine operation for enabling the drive for said drive member.

13. In a calculating machine, a register comprising a series of numeral wheels, means for returning said register to a home position, means for effecting power resetting of said register by simultaneous zeroizing of said numeral wheels, said resetting effecting means including a normally inactive drive member on said frame, a common control for said returning and resetting means, means operable by manipulation of said control for starting the register return operation and for conditioning a drive connection for said drive member, and means controlled by said register upon return thereof to home position for enabling the drive for said drive member.

14. In a calculating machine, a frame, a shiftable carriage on said frame, a register in said carriage, a source of power including a cyclically operable clutch, means mounted in said carriage for resetting said register, a normally inactive drive element on said frame for said resetting means, a normally disabled drive connection between said clutch and said resetting drive element, means operable by said clutch for performing another machine operation including settable control means for engaging said clutch and starting said machine operation, means controlled by said control means upon setting thereof for conditioning said drive connection for operation without starting operation of said drive element, and means operated by said machine operation performing means for enabling said drive connection to operate said element.

15. In a calculating machine having a transversely shiftable register and a source of power including a clutch; means for shifting said register, a normally disabled drive connection between said clutch and said shifting means, means for resetting said register, a normally disabled drive connection between said clutch and said resetting means, said last-named drive connection including a pair of normally disengaged rotary drive elements, and control means for engaging said clutch and enabling said shifting drive connection and for subsequently enabling said resetting drive connection by engaging said drive elements at the end of the shifting movement of said register.

16. In a calculating machine having a shiftable carriage, a plurality of numeral wheels mounted in said carriage for rotation about parallel transversely spaced axes, a resetting rack mounted for endwise movement in said carriage and operatively related to said numeral wheels, and a source of power; means for shifting said carriage, a normally disabled drive connection between said source of power and said shifting means, means for operating said resetting rack, a normally disabled drive connection between said source of power and said rack-operating means, a common control key for enabling said source of power and enabling said drive connection, and means controlled by said shifting drive connection for delaying the enabling of said resetting drive connection until said carriage has been shifted to a predetermined ordinal position thereof.

17. In a calculating machine having a shiftable carriage, a register mounted on said carriage, and a source of power; means for shifting said register, a normally disabled drive connection between said source of power and said shifting means, a shift control member for enabling said shifting drive connection, means for resetting said register, a normally disabled drive connection between said source of power and said resetting means, a resetting control member for enabling said resetting drive connection, yieldable blocking means operatively related to said control members for preventing simultaneous drive-enabling movement thereof, and means engageable by said carriage and operatively related to said blocking means for effecting yielding thereof.

18. In a calculating machine having a shiftable carriage, a register mounted on said carriage, and a source of power; means for shifting said register, a normally disabled drive connection between said source of power and said shifting means, a shift control member for enabling said shifting drive connection, means for resetting said register, a normally disabled drive connection between said source of power and said resetting means, a resetting control member for enabling said resetting drive connection, blocking means operatively related to said control members for preventing simultaneous drive-enabling movement thereof including a spring-urged slide normally positioned in operative relation to said resetting control member and a lever positioned for engagement by said carriage and operatively related to said slide for effecting movement thereof out of operative relation with said resetting control member.

19. In a calculating machine having a frame, a carriage mounted for transverse shifting movement on said frame, a register in said carriage, and a source of power; means for shifting said carriage, a normally disabled drive connection between said source of power and said shifting means, means for resetting said register including a reciprocable resetting element mounted in said carriage and reciprocable drive element for said resetting element mounted on said frame, a normally disabled rotary drive connection between said source of power and said drive element, and control means for enabling said shifting drive connection and for subsequently enabling said resetting drive connection at the end of the shifting movement of said carriage.

NEAL B. PINYAN.